(No Model.)
W. H. COOK.
COLLAPSIBLE AND ADJUSTABLE BICYCLE HANDLE.
No. 604,371. Patented May 24, 1898.
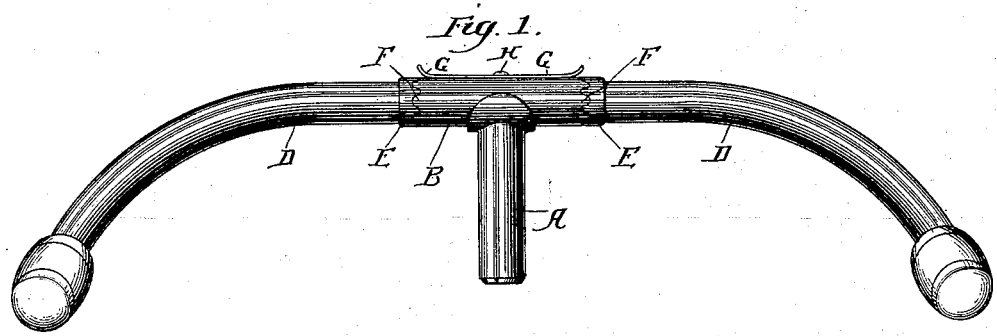
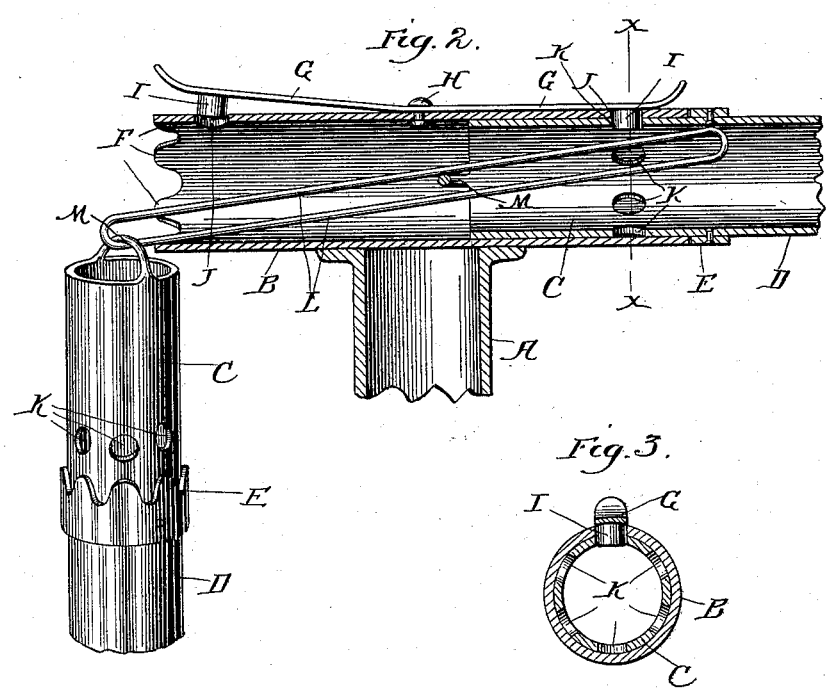
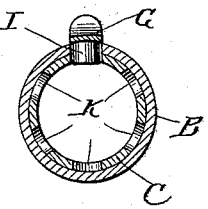
Witnesses:
H. B. Hallock.
S. S. Williamson
Inventor:
William H. Cook.
By Geo. H. Holgate
Attorney.

UNITED STATES PATENT OFFICE.

WILLIAM H. COOK, OF IRONWOOD, MICHIGAN.

COLLAPSIBLE AND ADJUSTABLE BICYCLE-HANDLE.

SPECIFICATION forming part of Letters Patent No. 604,371, dated May 24, 1898.

Application filed June 1, 1897. Serial No. 638,875. (No model.)

*To all whom it may concern:*

Be it known that I, WILLIAM H. COOK, a citizen of the United States, residing at Ironwood, in the county of Gogebic and State of Michigan, have invented a certain new and useful Improvement in Collapsible and Adjustable Bicycle-Handles, of which the following is a specification.

My invention relates to a new and useful improvement in collapsible and adjustable bicycle-handles, and has for its object to provide a simple and effective means by which either or both of the handle-bars of a bicycle may be removed from their normal position and swung downward, so as to decrease the width of the space occupied by said machine, which is especially advantageous when a bicycle is to be stored in a hall or other narrow compartment; and a further object of my invention is to provide for the adjustment of the handle-bars, so as to vary their height relative to the rider and to permit each bar to be adjusted independently of the other and without the use of a wrench.

With these ends in view this invention consists in the details of construction and combination of elements hereinafter set forth, and then specifically designated by the claim.

In order that those skilled in the art to which this invention appertains may understand how to make and use the same, the construction and operation will now be described in detail, referring to the accompanying drawings, forming a part of this specification, in which—

Figure 1 is a rear elevation of a handle-bar post, showing the handle-bars secured in their normal position and one of the several adjustments to which they may be brought; Fig. 2, an enlarged section of the post-head, showing one of the handle-bars in its normal position, while the other bar is withdrawn from the head and swung downward to a vertical position for reducing the width of the machine upon that side; and Fig. 3, a cross-section at the line *x x* of Fig. 2.

In carrying out my invention as here embodied A represents the handle-bar post adapted to fit within the spring-tube of a bicycle, and upon this post is formed or secured the cylindrical head B, said head being formed of a tube in which the ends C of the handles D may snugly fit. These handle-bars have secured or formed thereon the crown-rings E, the teeth of which are adapted to intermesh with the teeth F, formed upon the edges of the cylindrical head, as clearly shown in Fig. 1. In order to secure the ends of the handle-bars within the head after they have been therein inserted, a double-ended spring G is secured to the head at H, and has projecting downward therefrom the lugs I, said lugs passing through suitable holes J in the head and, when in their normal position, projecting within the holes K, which are formed in series around the ends of each of the handle-bars. From this it will be seen that when a handle-bar is passed within the head the teeth of the crown thereon will enter into engagement with the teeth F, and when the lug I has sprung into one of the holes K the handle-bar will not only be held against longitudinal withdrawal, but will also be held, by means of the intermeshing of the teeth, against axial rotation, and when thus held the handle-bar will be as rigid in all respects as though it formed a part of the head, and yet when it is desired to withdraw the handle-bar from the head it is quickly accomplished by lifting the spring G sufficiently to disengage the lug I from the hole K, or the handle-bar may be adjusted upon its axis by the operation of the spring G and a slight withdrawal of the handle-bar, when, after it has been adjusted as desired, it may be returned, so as to bring the crown-teeth into engagement with the teeth F, when the lug I will be sprung into another of the holes K.

When either or both of the handle-bars are removed from the head, it is desirable that they be not detached from the machine, and to avoid this I have provided an elongated link L, which engages the loop or staple M upon each of the ends C, and this permits the suspending of the handle-bars from the head without their complete detachment therefrom, as clearly shown in Fig. 2.

From the foregoing description it is obvious that when a bicycle is to be stored in a hallway or other narrow compartment, such as a baggage-car, the handle-bars may be withdrawn and suspended from the head, thereby reducing the width of the machine to approximately the width of the saddle, and this is very advantageous, as will be readily understood by those accustomed to riding a bicycle and having to store the same in narrow spaces or ship them upon railway trains.

Another great advantage of my improvement is that the rider may instantaneously adjust the handle-bars to the height best adapted for his position at the time without either dismounting the machine or the use of a wrench, since it is only necessary to lift one of the springs, adjust the corresponding handle-bar while guiding the machine by the other handle-bar, and then repeat the operation in connection with the last-named handle-bar. This is a feature which cannot be readily accomplished in handle-bars when both are adjusted in unison.

The fineness of the adjustment depending upon the pitch of the crown-teeth and the teeth F and also upon the holes K may be made to suit the fancy of the manufacturer or user by altering the pitch of said teeth and varying the position of the holes.

Having thus fully described my invention, what I claim as new and useful is—

A pair of handle-bars consisting of a stem, a tubular head secured at its center to the upper end of the stem and extending at right angles thereto, teeth formed at the ends of the head, a double-ended spring secured near the center of the head, lugs secured at each end of the spring and projecting through openings in the head to the interior thereof, the portion of the spring beyond the lugs being turned up to form finger-holds, two handle-bars having their inner ends adapted to fit in the head, each of said handles having a number of openings formed therearound in that portion fitting within the head, registering with the opening through which the lug projects crown-rings secured on each handle-bar a suitable distance from its inner end, said ring being notched to form teeth to intermesh with the teeth formed at the ends of the head, a loop formed with and extending across the end of each handle-bar and a link connecting the loops, as and for the purpose described.

In testimony whereof I have hereunto affixed my signature in the presence of two subscribing witnesses.

WILLIAM H. COOK.

Witnesses:
S. S. WILLIAMSON,
H. F. JAHN.